(12) United States Patent
Nolan et al.

(10) Patent No.: US 12,268,937 B1
(45) Date of Patent: Apr. 8, 2025

(54) EXERCISE TRAINING SYSTEM AND METHOD OF USE

(71) Applicant: Hardcore Fitness Boot Camp, Santa Clarita, CA (US)

(72) Inventors: Nicole K. Nolan, Santa Clarita, CA (US); Lawrence R. Nolan, Santa Clarita, CA (US)

( * ) Notice: Subject to any disclaimer, the term of this patent is extended or adjusted under 35 U.S.C. 154(b) by 259 days.

(21) Appl. No.: 18/102,468

(22) Filed: Jan. 27, 2023

Related U.S. Application Data

(63) Continuation-in-part of application No. 16/382,831, filed on Apr. 12, 2019, now abandoned.

(60) Provisional application No. 62/656,859, filed on Apr. 12, 2018.

(51) Int. Cl.
*A63B 24/00* (2006.01)
*A63B 71/06* (2006.01)

(52) U.S. Cl.
CPC ...... *A63B 24/0075* (2013.01); *A63B 71/0622* (2013.01); *A63B 2024/0065* (2013.01); *A63B 2024/0068* (2013.01); *A63B 2024/0081* (2013.01); *A63B 2071/0658* (2013.01); *A63B 2071/0694* (2013.01); *A63B 2225/105* (2013.01); *A63B 2225/20* (2013.01)

(58) Field of Classification Search
CPC ............................................ A63B 24/00–0087
See application file for complete search history.

(56) References Cited

U.S. PATENT DOCUMENTS

| 7,465,257 | B1 | 12/2008 | Morgan, Jr. |
| 7,628,730 | B1 | 12/2009 | Watterson et al. |
| 7,955,219 | B2 | 6/2011 | Birrell et al. |
| 8,105,207 | B1 | 1/2012 | Lannon et al. |
| 10,279,212 | B2 | 5/2019 | Dalebout et al. |
| 2002/0022551 | A1 | 2/2002 | Watterson et al. |
| 2003/0032524 | A1 | 2/2003 | Lamar et al. |
| 2005/0209050 | A1 | 9/2005 | Bartels |
| 2008/0051256 | A1 | 2/2008 | Ashby et al. |
| 2008/0242509 | A1 | 10/2008 | Menektchiev et al. |
| 2009/0048070 | A1 | 2/2009 | Vincent et al. |
| 2009/0270227 | A1 | 10/2009 | Ashby et al. |
| 2010/0197460 | A1 | 8/2010 | Czarnecki |
| 2010/0197461 | A1 | 8/2010 | Czarnecki |
| 2011/0172060 | A1 | 7/2011 | Morales et al. |
| 2012/0015779 | A1* | 1/2012 | Powch .................. G06Q 10/06 482/9 |
| 2012/0040799 | A1 | 2/2012 | Jaquish et al. |
| 2012/0108394 | A1 | 5/2012 | Jones et al. |
| 2012/0277891 | A1 | 11/2012 | Aragones et al. |

(Continued)

FOREIGN PATENT DOCUMENTS

WO WO-2011072111 A2 * 6/2011 ............. A61B 5/222

*Primary Examiner* — Nyca T Nguyen
(74) *Attorney, Agent, or Firm* — Avek IP, LLC

(57) ABSTRACT

A split goal exercise system includes a plurality of exercise stations and a plurality of wristbands; wherein each station includes an overhead visual display configured to play a video, the video demonstrating one or more exercises performed by a fitness trainer, the one or more exercises including one or more modifications that are based on fitness level; wherein the video can be played on a mobile application to view on a mobile device; wherein the plurality of wristbands provides visual feedback to a fitness instructor, the visual feedback representing the fitness goal, fitness concern, or both of the user.

3 Claims, 5 Drawing Sheets

(56) References Cited

U.S. PATENT DOCUMENTS

| | | |
|---|---|---|
| 2014/0038781 A1 | 2/2014 | Foley et al. |
| 2014/0135173 A1 | 5/2014 | Watterson |
| 2014/0194250 A1 | 7/2014 | Reich et al. |
| 2014/0363800 A1 | 12/2014 | Harris et al. |
| 2015/0133748 A1 | 5/2015 | Edmonds et al. |
| 2015/0238817 A1 | 8/2015 | Watterson et al. |
| 2016/0129328 A1 | 5/2016 | Findlay |
| 2017/0007885 A1 | 1/2017 | Kerwin |
| 2017/0165525 A1 | 6/2017 | Tellez et al. |
| 2017/0197106 A1 | 7/2017 | Dalebout et al. |
| 2018/0064992 A1 | 3/2018 | Rothman et al. |
| 2018/0085630 A1 | 3/2018 | Capell et al. |
| 2018/0126249 A1 | 5/2018 | Consiglio et al. |
| 2018/0140903 A1 | 5/2018 | Poure et al. |
| 2018/0280782 A1 | 10/2018 | Lagree et al. |
| 2018/0361203 A1 | 12/2018 | Wang et al. |
| 2019/0126099 A1 | 5/2019 | Hoang |
| 2020/0353312 A1 | 11/2020 | Smith |

\* cited by examiner

EXERCISE TRAINING SYSTEM AND METHOD OF USE

CROSS REFERENCE TO RELATED APPLICATIONS

This application is a continuation of U.S. application Ser. No. 16/382,831, filed on Apr. 12, 2019, which claims priority to U.S. Provisional Patent Application No. 62/656,859, filed on Apr. 13, 2018. Each of the aforementioned applications is incorporated herein by reference in its entirety.

BACKGROUND

1. Field of the Invention

The present invention relates generally to exercise systems, and more specifically, to an exercise system that allows for split goals for users working out in the same class or environment.

2. Description of Related Art

Exercise systems are well known in the art. Common practices include taking classes or following a guided video to partake in an exercise activity. These conventional systems do not always take into account the various needs and goals of the individuals. For example, a first user may desire to lose weight, while another user desires to gain strength. Both of these goals cannot always be accomplished by the same exercise system at the same time.

It is an object of the present invention to provide an exercise system that allows for split goals. In other words, users with different goals can partake in the same class or workout in the same environment, while being provided with exercise routines that are suitable for their indicated goals.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
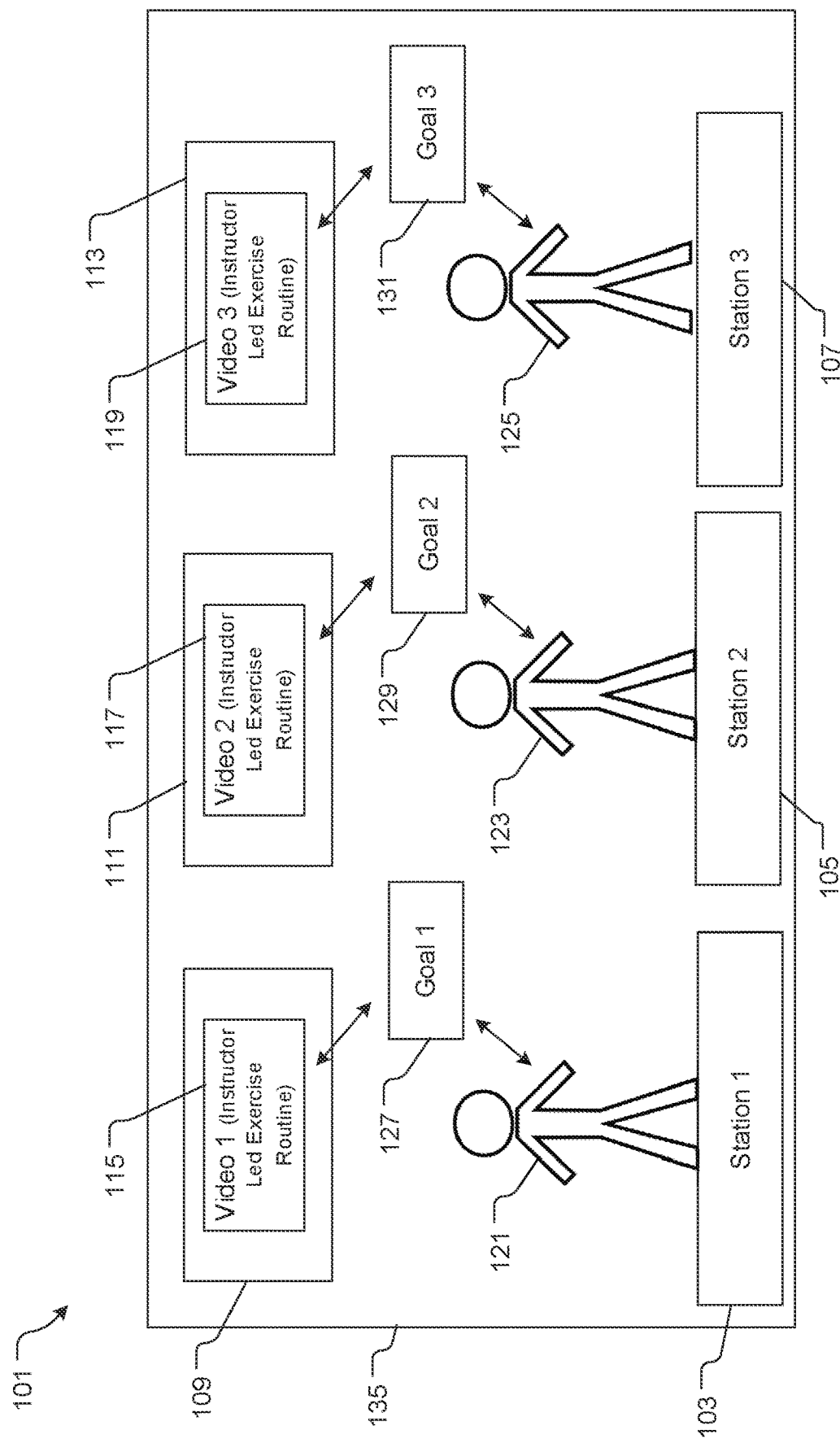
FIG. 1 is a schematic of an exercise system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional exercise systems. Specifically, the present invention allows for two or more individuals to workout in the same group, but be provided with instructions that are suitable to their own specified goals. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a schematic of an exercise system 101 in accordance with a preferred embodiment of the present application in accordance with a preferred embodiment of the present application. It will be appreciated that system 101 overcomes one or more of the above-listed problems commonly associated with conventional exercise systems.

In the contemplated embodiment, system 101 includes a plurality of stations 103, 105, 107, each having an overhead visual display 109, 111, 113. Each overhead visual display is configured to provide a video 115, 117, 119. In the preferred embodiment, the videos are instructor led exercise routines. Each user 121, 123, 125 of the plurality of stations can provide a goal 127, 129, 131 for their exercise routine. The system is configured to correlate the goal of each user with the associated video, thereby providing for a personalized workout that is still in a group setting, but that is configured to help the user meet their individual goals.

As an example, user 121 may have the goal of losing weight. Indication of such a goal will direct the video 115 to provide the user with a lot of cardio and repetition with a lower weight amount. User 123 may have the goal of gaining strength, and as such, video 117 will provide the user with fewer repetitions, but with a larger weight. The system still allows for user 121 and user 123 to be part of the same exercise experience 135, such as a class.

It should be appreciated that one of the unique features believed characteristic of the present application is the use of stations with overhead visuals to provide users with videos that are suitable to their goals.

Figure 2:
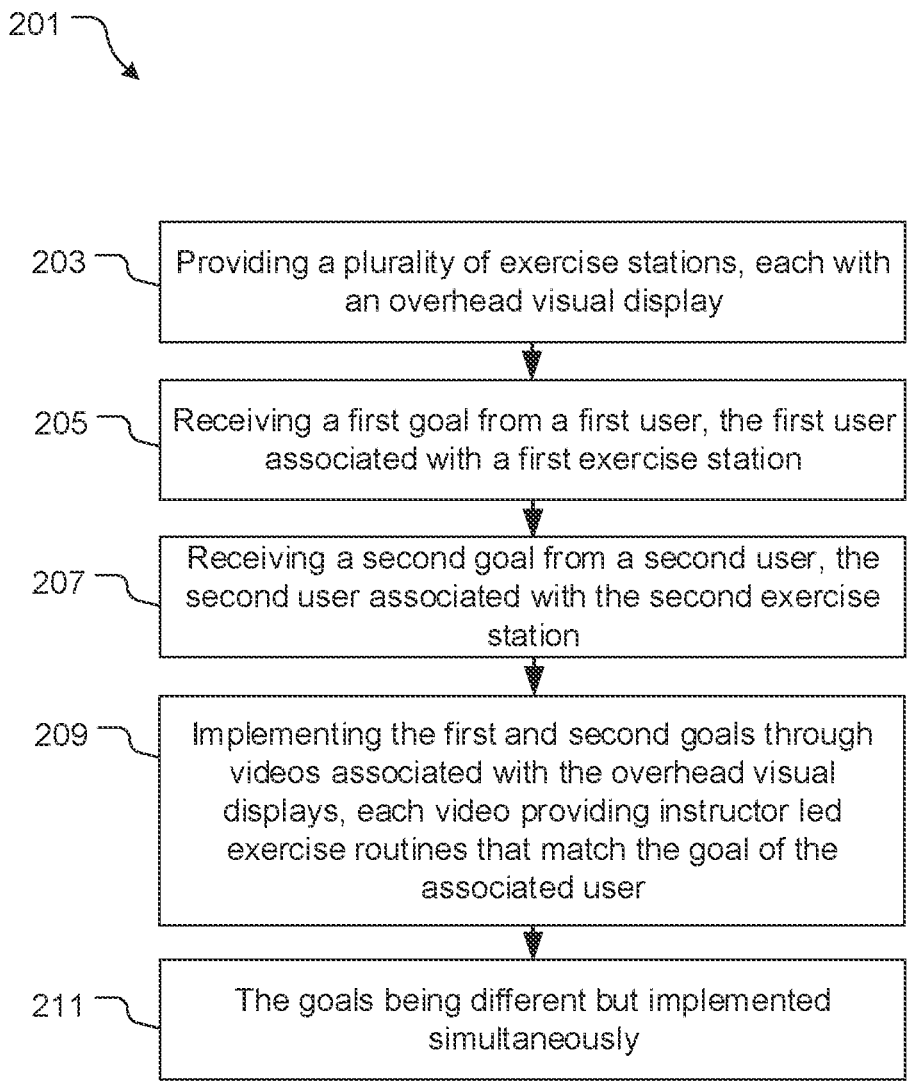
FIG. 2 is a flowchart of a method of use of the system of FIG. 1.

In FIG. 2, a flowchart 201 depicts a method of use of system 101. During use, a plurality of stations are created, wherein each station has an overhead display configured to play a video, as shown with box 203. A first user will provide a first goal, and a second user will provide a second goal (it should be appreciated that the system is suitable for a plurality of users), as shown with boxes 205, 207. The first display will play a video suitable for the first goal, while the second display plays a video suitable for the second goal, as shown with boxes 209. The goals can be different or the same, but the videos are suitable for the goal of the associated user, as shown with box 211.

Figure 3:
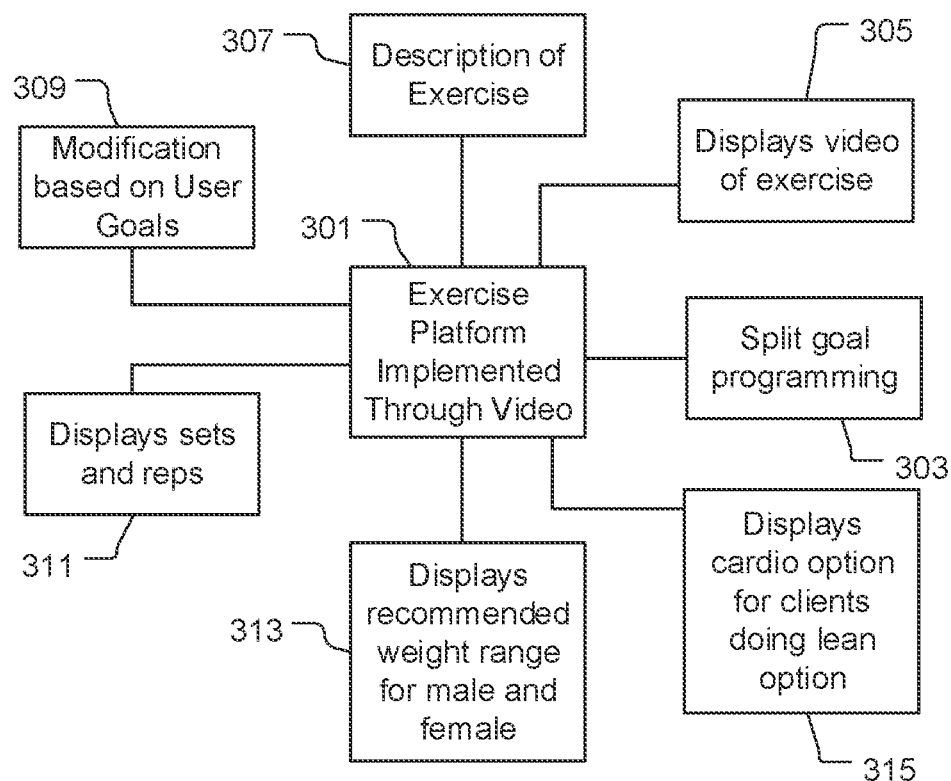
FIG. 3 is a simplified schematic of the features of an exercise platform that works with the video systems of FIG. 1 to provide split goals.

In FIG. 3, a simplified schematic depicts the features of a platform 301 that works with the system of FIG. 1, to implement split goal exercise programs 303 through the displays and videos 305 of the present invention. The platform includes the following features, a description of exercises 307, modification of the exercises per the user desired goals 309, a display of reps and sets 311, a display of recommended weight range for male and female 313, and a display of cardio options for users doing the lean option 315.

Figure 4:
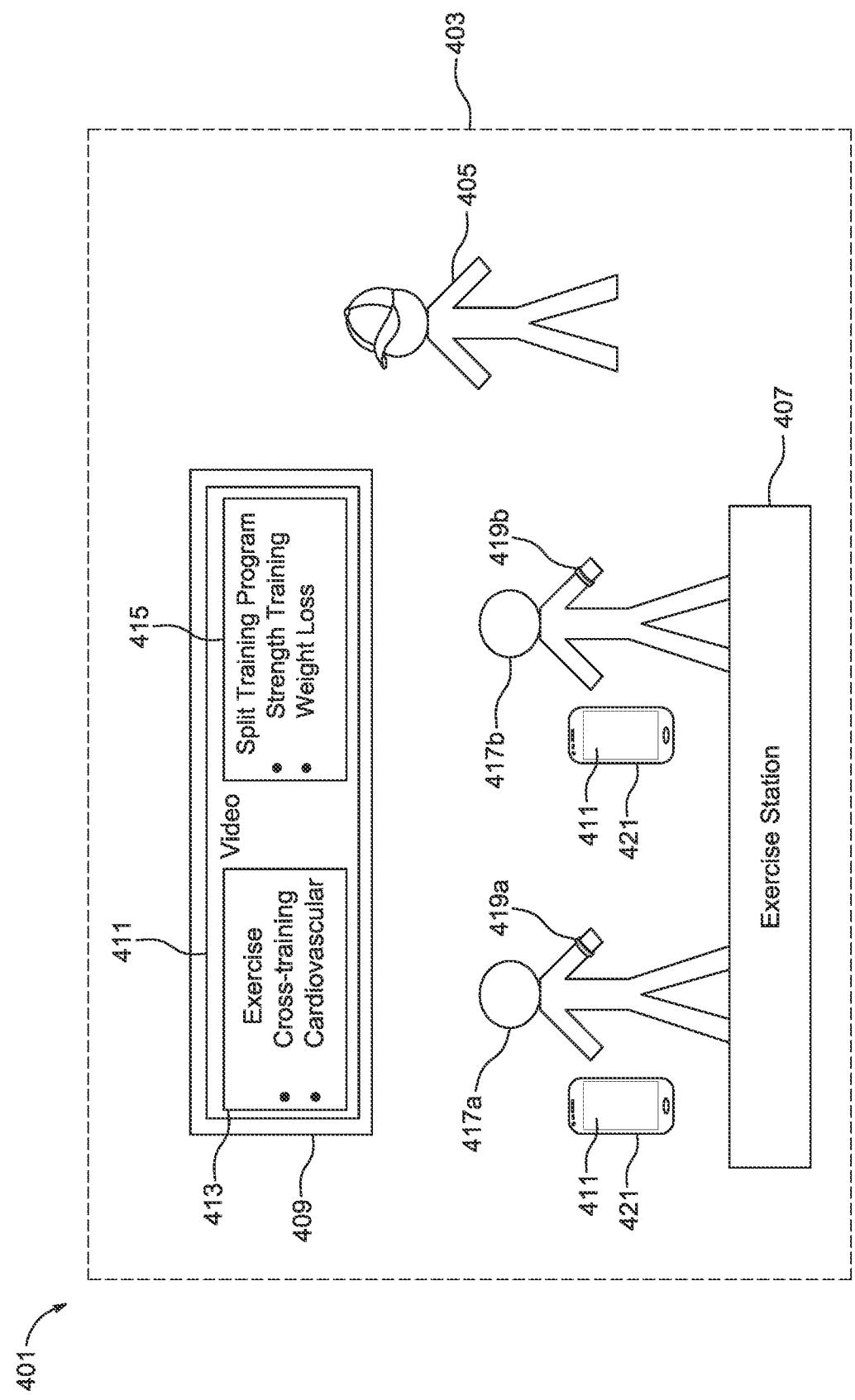
FIG. 4 is a schematic of an exercise system in accordance with one or more embodiments of the present application.

In FIG. 4, an alternative exercise system 401 is depicted in accordance with one or more embodiments of the present invention. It should be understood that system 401 can be implemented in an exercise class 403 that is led by a fitness instructor 405.

In the contemplated embodiment, system 401 includes a plurality of exercise stations 407, each station 407 having an overhead visual display 409. Each overhead video display 409 is configured to play a video 411 that demonstrates one or more exercises 413 performed by a fitness trainer to show proper technique, movement and pacing for such exercises. The exercises 413 include one or more modifications that are based on fitness level (e.g., beginner, intermediary, or advanced). The video 411 also includes a split training program 415 that categorizes the exercises 413 based on a desired fitness goal (e.g., weight loss or strength training). For example, for weight loss, the exercises 413 are a combination of cross-training and cardiovascular exercises; and for strength training, the exercises 413 are cross-training exercises without the cardiovascular exercises.

It should be appreciated that the split training program 415 allows a plurality of users (e.g., user 417a and user 417b; generally referred to as users 417) to exercise side-by-side and experience the exercise class 403 together. For example, user 417a can perform variations of the exercises 413 that are tailored for weight loss with beginner level modifications while user 417b can perform variations of the exercises that are tailored for strength training with intermediary modifications. This allows both users 417a, 417b to exercise together without adhering to each other's fitness goals and/or fitness concerns.

During use, each user 417 selects a wristband (e.g., wristband 419a and wristband 419b; generally referred to as wristband 419) to wear during the exercise class 403. Each wristband 419 includes a color that correlates to a designated fitness goal and/or fitness concern. For example, the wristband 419 can be white (indicating the user is a first-time visitor), purple (indicating the user is seeking to build muscle), yellow (indicating the user has an injury and/or needs exercise modification), blue (indicating the user seeks advanced exercise movement), or green (indicating the user is a beginner). The wristband 419 can come in other colors, designs, images, or the like to indicate the fitness goal and/or fitness concern.

It should be appreciated that the wristband 419 provides visual feedback to the fitness instructor 405 so that the fitness instructor 405 can immediately identify the fitness goal and/or fitness concern of each user and provide feedback to each user as needed.

In some embodiments, system 401 can be implemented in a mobile application, such that the video 411 can be viewed on a mobile device 421 such as a cellphone or tablet. The user 417 can view the video 411 up close during the exercise class 403 or at a different location, such as their home.

Figure 5:
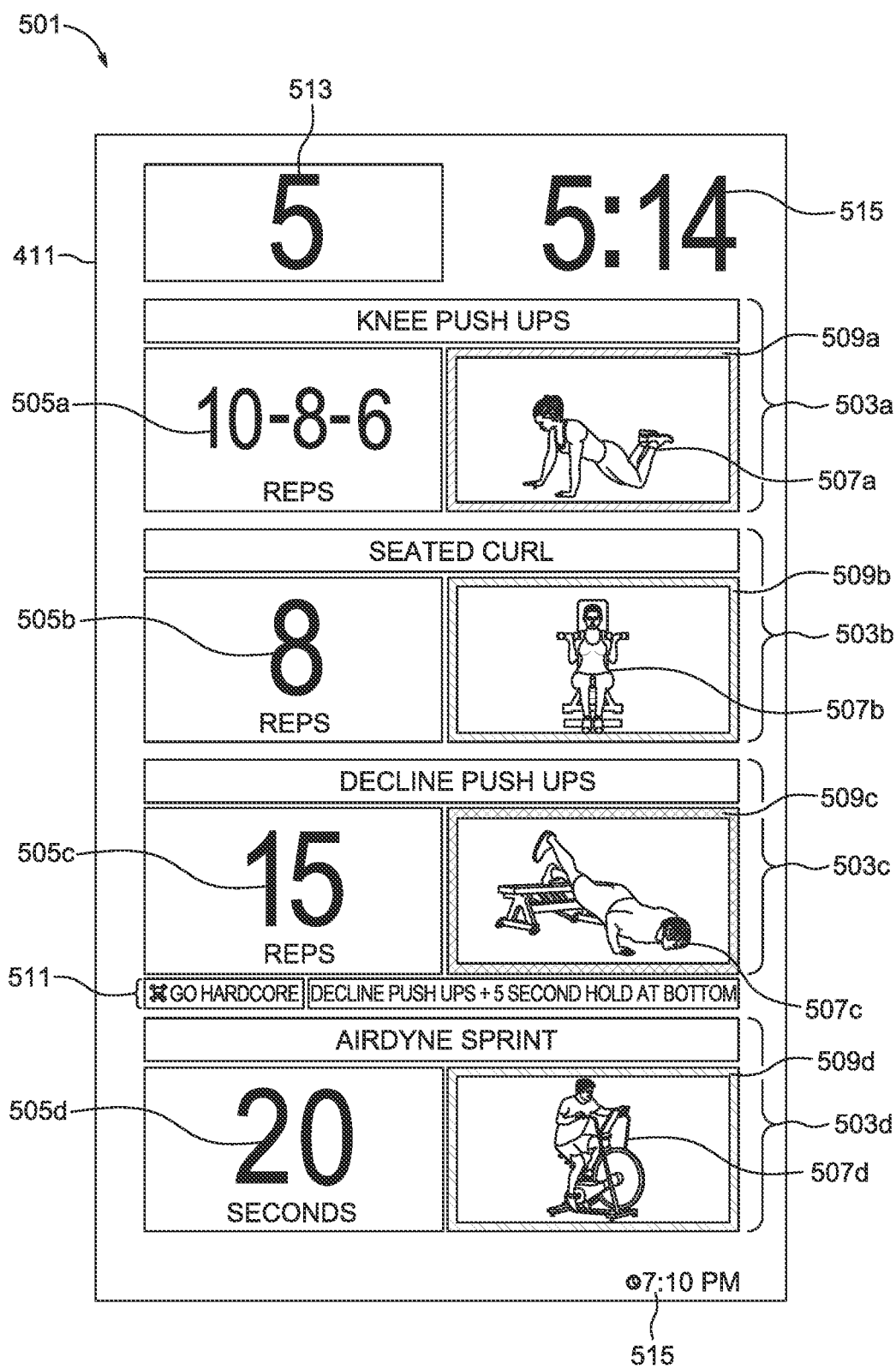
FIG. 5 is a screenshot of an example exercise circuit can be featured in the video of FIG. 4.

In FIG. 5, a screenshot of an example exercise circuit 501 that can be featured in the video 411. As shown, the exercise circuit 501 includes a first exercise 503a (e.g., knee pushups), a second exercise 503b (e.g., seated curl), a third exercise 503c (e.g., decline pushups), and a fourth exercise 503d (airdyne sprint). Each exercise 503 shows the number of repetitions and/or timing 505 required of their respective exercise to complete in order to move on to the proceeding exercise. In addition, each exercise 503 includes a miniature video 507 of a fitness trainer demonstrating proper technique, movement and pacing of their respective exercises. It should be understood that each miniature video 507 repeats itself for the duration of the exercise circuit 501 so that each level of an exercise can be viewed.

Each miniature video 507 demonstrates a beginner level, intermediary level, and advanced level of their respective exercise as indicated by a colored border 509. For example, the colored border can be green (indicating easy and/or beginner level, white (indicating intermediary level), or blue (indicating advanced level). A modification section 511 can provide information which corresponds to the colored border 509 of a miniature video 507.

It should be understood that the number of exercises in each exercise circuit can vary. In addition, it should be appreciated that the order, positioning, arrangement, and/or presentation of the exercises via the video 411 can vary. Further, it should be appreciated that the video 411 can include a station number indicator 513, a station countdown timer 515, and a current time clock 517 for visual aid.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A split goal exercise system, comprising:
a plurality of exercise stations, each exercise station having:
an overhead visual display configured to play a video, the video demonstrating one or more exercises performed by a fitness trainer, the one or more exercises including one or more modifications that are based on fitness level, the fitness level including beginner level, intermediary level, and advanced level;
wherein the video includes a split training program that categorizes the one or more exercises based on a desired fitness goal, the desired fitness goal including strength training and weight loss; and
a plurality of wristbands, each wristband including a color representing a fitness goal, fitness concern, or both;
wherein each exercise station allows a plurality of users to perform the one or more exercises based on their desired fitness goal, wherein each user has the same or different desired fitness goal between each other, and each user performs the one or more exercises using the one or more modifications based on their fitness level;
wherein the plurality of wristbands provides visual feedback to a fitness instructor, the visual feedback representing the fitness goal, fitness concern, or both of the user.

2. The system of claim 1, wherein the video is played on a mobile application such that a user of the plurality of users can view on a mobile device.

3. The system of claim 1, wherein the color of each wristband is one of white, purple, yellow, blue, or green.

* * * * *